US006482869B1

(12) United States Patent
Bolte et al.

(10) Patent No.: US 6,482,869 B1
(45) Date of Patent: Nov. 19, 2002

(54) ADHESIVE WITH MULTISTAGE CURING AND THE UTILIZATION THEREOF DURING THE PRODUCTION OF COMPOSITE MATERIALS

(75) Inventors: Gerd Bolte, Monheim (DE); Andreas Ferencz, Duesseldorf (DE); Thomas Huver, Duesseldorf (DE)

(73) Assignee: Henkel Kommanditgesellschaft aut Aktien, Duesseldorf (DE)

( * ) Notice: Subject to any disclaimer, the term of this patent is extended or adjusted under 35 U.S.C. 154(b) by 0 days.

(21) Appl. No.: 09/581,372

(22) PCT Filed: Dec. 1, 1998

(86) PCT No.: PCT/EP98/07752

§ 371 (c)(1),
(2), (4) Date: Aug. 10, 2000

(87) PCT Pub. No.: WO99/29754

PCT Pub. Date: Jun. 17, 1999

(30) Foreign Application Priority Data

Dec. 10, 1997  (DE) .......................... 197 54 926

(51) Int. Cl.$^7$ .......................... C08F 2/50; C08G 18/67; C09J 175/16
(52) U.S. Cl. .......................... 522/35; 522/34; 522/36; 522/39; 522/42; 522/90; 522/96; 522/97; 522/121; 522/142; 522/174
(58) Field of Search .............................. 522/90, 96, 97, 522/42, 121, 142, 174, 34, 35, 36, 39

(56) References Cited

U.S. PATENT DOCUMENTS

| 4,507,458 A | | 3/1985 | Shiraki et al. ................ 528/49 |
| 5,478,427 A | | 12/1995 | Huver et al. ............. 156/273.3 |
| 5,744,512 A | * | 4/1998 | Kohler et al. |
| 6,031,044 A | * | 2/2000 | Kokel et al. |

FOREIGN PATENT DOCUMENTS

| DE | 29 13 676 | 10/1980 |
| DE | 40 41 753 | 6/1992 |
| EP | 0 175 474 | 3/1986 |
| EP | 0 564 483 | 10/1993 |
| EP | 0 603 046 | 6/1994 |

OTHER PUBLICATIONS

Translation of JP 1–229022, Sep. 1989.*

* cited by examiner

*Primary Examiner*—Susan W. Berman
(74) *Attorney, Agent, or Firm*—Stephen D. Harper

(57) ABSTRACT

An adhesive useful in making composites includes two components A and B. Component A includes at least one polymer having a molecular weight ($M_n$) of at least 800 that has at least one functional group polymerizable by irradiation with UV light or with electron beams and has at least one functional group capable of reacting with a compound having at least one acidic hydrogen atom. Component B includes at least one compound having a molecular weight ($M_n$) of from about 100 to about 8000 which has at least two functional groups polymerizable by irradiation with UV light or with electron beams.

6 Claims, No Drawings

ADHESIVE WITH MULTISTAGE CURING AND THE UTILIZATION THEREOF DURING THE PRODUCTION OF COMPOSITE MATERIALS

The invention relates to an adhesive comprising two components A and B, component A having at least two different functional groups and component B having at least two similar functional groups.

The mechanical production of composite materials, especially composite films, is frequently conducted in the art by lamination using solvent-based adhesives. From a variety of standpoints, however, such a procedure is disadvantageous.

When using solvent-based adhesives in lamination, for example, it is necessary to evaporate considerable volumes of solvent during the laminating process, involving high energy consumption. A further necessity, for the purpose of avoiding the emission of solvent vapors into the atmosphere, is extensive cleaning of the waste air produced during evaporation of the solvent. In recent times, therefore, the tendency when producing composite materials has been more and more toward using solventless systems rather than those containing solvent.

However, the renunciation of solvents impacts very adversely on the processability of an adhesive. Adhesives suitable for producing composite materials are intended first to have a suitable processing viscosity but, as far as possible, to release only small volumes of volatiles into the environment. A further requirement of such adhesives is that directly after application to at least one of the materials to be joined, and after joining thereof, they possess sufficiently good initial adhesion to prevent, as far as possible, the bonded materials from moving relative to one another. Furthermore, however, an adhesive bond of this kind should also possess a sufficient degree of flexibility to withstand the various tensile and extension stresses to which the composite material is generally exposed while still at the processing stage, and to do so without damage to the adhesive bond and without damage to the bonded material.

With the prior art, conventional, solvent-free adhesives, therefore, there is generally a fundamental disadvantage in that the adhesion properties of the adhesive following application are unsatisfactory, owing to the low viscosity, and, accordingly, the adhesive bond may not be subjected to any stresses until it has finally cured, in order that the composite material maintains the form intended by adhesive bonding. This, however, necessitates long curing times, which frequently negate the economy of composite materials produced using such adhesives.

One approach to avoiding the disadvantages described above was to use a multistage-curing adhesive system in the production of composite materials. Adhesives were used which in a first stage were subjected to a rapid, first curing reaction by irradiation. The strength of the adhesive bond following this first curing reaction was said to be such as to enable the bonded articles or materials to be handled without problems. In a second curing stage, the adhesive then cured further until it had reached the desired ultimate strength.

DE-A 29 13 676 discloses a process for producing composite films by means of solvent-free adhesives. It describes a solvent-free adhesive which is liquid at room temperature and consists of oligomeric and/or polymeric esters and/or ethers which contain both free isocyanate groups and free (meth)acrylate groups in one molecule.

EP-B 0 564 483 relates to reactive contact adhesives, processes for preparing them, and their use. The document describes urethane-based coating compositions which are polymerizable in two stages and which by virtue of the presence of UV-polymerizable acrylate groups can be cured in a first curing stage to a material which has solidified but cannot yet be embossed or deformed in such a manner as to impart structure, after which, in a second, subsequent stage, irreversible solidification takes place. To reduce the viscosity, monofunctional acrylates are added to the adhesive. Following irradiation, the adhesive described exhibits pressure tack; the intended use of the contact adhesive described is said to be the adhesive bonding of wood and/or plastics parts at up to about 70° C., preferably at room temperature.

In many cases, composite materials are subjected directly after their production to further processing operations which demand a high degree of flexibility from the composite material. The adhesive bond present in the composite material must therefore possess sufficient flexibility to permit its further processing, without adverse effects owing to a lack of flexibility of the adhesive bond. For this purpose it is necessary for the adhesive bond to possess, initially, sufficient strength to prevent separation of the composite material into its original constituents, but not yet to be so strong that adverse effects owing to an excessively strong adhesive bond arise under tensile or flexural stress.

The adhesives known from the prior art have the disadvantage that they exhibit either excessively strong initial adhesion, which has a deleterious effect on the flexibility of the material, or else inadequate ultimate strength, which may be disadvantageous for the service properties of the composite material. Furthermore, the reactive diluents described in the prior art are frequently not fully reacted. This may lead to odor nuisance and even, if appropriate, to a health risk owing to migrateable compounds of low molecular mass (migrants).

The object of the present invention was therefore to provide an adhesive which is suitable for producing composite materials especially for producing film composites, which after bonding still results in sufficient flexibility of the adhesive bond and after complete curing leads to composite materials having excellent strength values in respect of the adhesive bond.

The object of the invention is achieved by means of an adhesive which comprises a polymer of low viscosity that contains both irradiation-polymerizable functional groups and moisture-curing functional groups and a compound having a molecular weight of at least about 100 and at least two irradiation-polymerizable functional groups.

The invention provides an adhesive comprising two components A and B, (a) component A being at least one polymer having a molecular weight ($M_n$) of at least 800 that has at least one functional group polymerizable by irradiation with UV light or with electron beams and has at least one functional group capable of reacting with a compound having at least one acidic hydrogen atom, and (b) component B being at least one compound having a molecular weight ($M_n$) of from about 100 to about 8000 which has at least two functional groups polymerizable by irradiation with UV light or with electron beams.

In one preferred embodiment of the present invention the molecular weight ($M_n$) of the at least one compound used as component B which has at least two functional groups polymerizable by irradiation with UV light or with electron beams is from about 100 to about 2000.

A polymerizable functional group is a group which is able to react by free-radical, anionic or cationic addition polymerization, polycondensation or polyaddition with a suitable, further functional group, with an increase in the molecular weight of the molecule which carries it. In the case of an increase in molecular weight by free-radical addition polymerization, the functional group is generally and preferably an olefinically unsaturated double bond. In the case of an increase in molecular weight by polycondensation the functional group may, for example, be an acid group or an alcohol group; in the case of polyaddition, examples of suitable functional groups are isocyanate groups or epoxide groups.

A functional group polymerizable by irradiation with UV light or with electron beams is suitably, for example, a group having an olefinically unsaturated double bond. In the context of the present invention, preferred olefinically unsaturated double bonds are those as present, for example, in the derivatives of acrylic acid or of styrene. Particularly suitable derivatives, which are also preferred in the context of the present invention, are those of acrylic acid, examples being the acrylates and the methacrylates.

In the subsequent course of the text, when reference is being made to the properties of an adhesive, the term "curing" or the like as commonly used in general by the skilled worker will be utilized fairly often. The "curing" of a composition comprising polymerizable compounds is based in general on a polymerization reaction which is associated at least with an increase in the molecular weight of the compounds present in the composition. Normally, however, crosslinking reactions also take place at the same time. The terms "curing" or the like therefore relate, in the context of the following text, to polymerization reactions such as may take place within individual components of the composition in connection with which the term is used in each case; for example, the radiation-induced polymerization of a component which carries double bonds. The terms likewise relate to polymerization reactions as may take place between different components of the particular composition in question; for example, the reaction of a component which carries isocyanate groups with a component which carries OH groups. The terms further relate to polymerization reactions as may take place between a component of the composition in question and a component which enters the composition owing to external influence; for example, the reaction between isocyanate groups and atmospheric moisture.

In the context of the present invention, a functional group capable of reacting with a compound having at least one acidic hydrogen atom is in particular the isocyanate group or the epoxide group, the isocyanate group being particularly preferred.

A compound having an acidic hydrogen atom is a compound having an active hydrogen atom which can be determined in accordance with the Zerevitinov test and is attached to an N, O or S atom. This definition includes in particular the hydrogen atoms of water and of carboxyl, amino, imino, hydroxyl, and thiol groups. In the context of the present invention, particular preference is given to water, or to compounds having amino groups or hydroxyl groups or both, or to mixtures of two or more thereof.

Component A in the adhesive of the invention is at least one polymer having a molecular weight of at least 800. Polymers suitable for use as component A are all polymeric compounds which may commonly be used in adhesives, examples being polyacrylates, polyesters, polyethers, polycarbonates, polyacetals, polyurethanes, polyolefins, or rubber polymers such as nitrile rubber or styrene/butadiene rubber, provided they have at least one functional group polymerizable by irradiation with UV light or with electron beams and with at least one functional group capable of reacting with a compound having at least one acidic hydrogen atom.

In the adhesives of the invention it is preferred, however, to make use as component A of polyacrylates, polyesters or polyurethanes, since these polymers offer a particularly simple opportunity to attach the functional groups required by the invention to the polymer molecule.

The polymers which may be employed in accordance with the invention as component A can be prepared with particular simplicity by starting from a base polymer which has in the polymer molecule at least two functional groups which are reactive with isocyanate groups, these groups being preferably OH groups. The desired functional group can be attached to a base polymer of this kind with particular simplicity by reaction with a polyisocyanate or with a suitably functionalized monoisocyanate.

A polymer suitable for use as the base polymer is, for example, a polymer selected from a group containing polyesters, polyethers, polycarbonates or polyacetals having a molecular weight ($M_n$) of at least about 200, or mixtures of two or more thereof, which have terminal OH groups.

In the context of the present invention, polyesters which can be used as base polymers for preparing component A may be obtained, in a manner known to the skilled worker, by polycondensation of acid components and alcohol components, in particular by polycondensation of a polycarboxylic acid or of a mixture of two or more polycarboxylic acids and a polyol or a mixture of two or more polyols.

Polycarboxylic acids suitable in the context of the present invention for preparing the base polymer may have an aliphatic, cycloaliphatic, araliphatic, aromatic or heterocyclic parent structure and in addition to the at least two carboxylic acid groups may further comprise one or more substituents which are nonreactive in a polycondensation, examples being halogen atoms or olefinically unsaturated double bonds. If desired, instead of the free carboxylic acids, it is also possible to use their anhydrides (where they exist) or their esters with $C_{1-5}$ monoalcohols, or mixtures of two or more thereof, for the polycondensation.

Examples of suitable polycarboxylic acids are succinic acid, adipic acid, suberic acid, azelaic acid, sebacic acid, glutaric acid, phthalic acid, isopthalic acid, terephthalic acid, trimellitic acid, phthalic anhydride, tetrahydrophthalic anhydride, hexahydro-phthalic anhydride, tetrachlorophthalic anhydride, endomethylenetetrahydrophthalic anhydride, glutaric anhydride, maleic acid, maleic anhydride, fumaric acid, dimeric fatty acids or trimeric fatty acids or mixtures of two or more thereof. If desired, minor amounts of monofunctional fatty acids may be present in the reaction mixture.

As diols for preparing a polyester or polycarbonate which can be used as the base polymer it is possible to use a large number of polyols. Examples are aliphatic polyols having from 2 to 4 OH groups per molecule. The OH groups may be an either primary or secondary attachment. Examples of suitable aliphatic polyols include ethylene glycol, 1,2-propanediol, 1,3-propanediol, 1,4-butanediol, 1,3-butanediol, 2,3-butanediol, 1,4-butenediol, 1,4-butynediol, 1,5-pentanediol, and the isomeric pentanediols, pentenediols or pentynediols or mixtures of two or more thereof, 1,6-hexanediol, and the isomeric hexanediols, hexenediols or hexynediols or mixtures of two or more thereof, 1,7-heptanediol and the isomeric heptane-, heptene- or heptynediols, 1,8-octanediol and the isomeric octane-, octene- or octynediols, and the higher homologs or isomers of said compounds, as they result for the skilled worker from a stepwise extension of the carbon chain by one $CH_2$ group in each case or with introduction of branching into the carbon chain, or mixtures of two or more thereof.

Likewise suitable are alcohols of higher functionality, such as glycerol, trimethylolpropane, pentaerythritol or sugar alcohols such as sorbitol or glucose, for example, and also oligomeric ethers of said substances with themselves or in a mixture of two or more of said compounds with one another, an example being polyglycerol having a degree of polymerization of from about 2 to about 4. With the higher polyfunctional alcohols it is also possible for one or more OH groups to be esterified with monofunctional carboxylic acids having 1 to about 20 carbon atoms, with the proviso that on average at least two OH groups are retained. Said higher polyfunctional alcohols may be used in pure form or, where possible, as technical-grade mixtures obtainable in the synthesis of said alcohols.

As the polyol component for preparing the base polymers a further possibility is to use the reaction products of low molecular mass polyfunctional alcohols with alkylene oxides, which are known as polyether polyols. Polyether polyols intended for use to prepare polyesters suitable as base polymers are preferably obtained by reacting polyols with alkylene oxides. The alkylene oxides have preferably two to about four carbon atoms. Suitable examples are the reaction products of ethylene glycol, propylene glycol, the isomeric butanediols or hexanediols as mentioned above, or mixtures of two or more thereof with ethylene oxide, propylene oxide or butylene oxide or mixtures of two or more thereof. Also suitable, furthermore, are the reaction products of polyfunctional alcohols such as glycerol, trimethylolethane or trimethylolpropane, pentaerythritol or sugar alcohols or mixtures of two or more thereof with said alkylene oxides to give polyether polyols. Particularly suitable polyether polyols are those obtainable from said reactions and having a molecular weight ($M_n$) of from about 100 to about 3000, preferably from about 200 to about 2000. Said polyether polyols may be reacted with the abovementioned polycarboxylic acids in a poly-condensation reaction to give the polyesters which can be used as base polymers.

Likewise suitable as base polymers having terminal OH groups are polyether polyols, as produced, for example, in the manner depicted above. Polyether polyols are normally obtained by reacting a starting compound having at least two reactive hydrogen atoms with alkylene oxides or arylene oxides, examples being ethylene oxide, propylene oxide, butylene oxide, styrene oxide, tetrahydrofuran or epichlorohydrin or mixtures of two or more thereof.

Examples of suitable starting compounds are water, ethylene glycol, 1,2- or 1,3-propylene glycol, 1,4- or 1,3-butylene glycol, 1,6-hexanediol, 1,8-octanediol, neopentyl glycol, 1,4-hydroxymethylcyclohexane, 2-methyl-1,3-propanediol, glycerol, trimethylolpropane, 1,2,6-hexanetriol, 1,2,4-butanetriol, trimethylolethane, pentaerythritol, mannitol, sorbitol, methyl glycosides, sugars, phenol, isononylphenol, resorcinol, hydroquinone, 1,2,2- or 1,1,2-tris (hydroxyphenyl) ethane, ammonia, methylamine, ethylenediamine, tetra- or hexamethyleneamine, triethanolamine, aniline, phenylenediamine, 2,4- and 2,6-diaminotoluene and polyphenylpolymethylenepolyamines as obtainable by aniline-formaldehyde condensation.

Likewise suitable for use as base component are polyether polyols which have been modified by vinyl polymers. Products of this kind are obtainable, for example, by polymerizing styrene or acrylonitrile or a mixture thereof in the presence of polyethers.

A polyether polyol which is particularly suitable for use as a base polymer in the context of the present invention is polypropylene glycol having a molecular weight from about 300 to about 1500.

Likewise suitable as the base polymer or as a polyol component for preparing the base polymer are polyacetals. Polyacetals are compounds obtainable by reacting glycols, such as diethylene glycol or hexanediol, for example, with formaldehyde. Polyacetals which can be used in the context of the invention may also be obtained by the polymerization of cyclic acetals.

Further compounds suitable as base polymers or as polyols for preparing the base polymers are polycarbonates. Polycarbonates may be obtained, for example, by the reaction of the abovementioned polyols, especially of diols such as propylene glycol, 1,4-butanediol or 1,6-hexanediol, diethylene glycol, triethylene glycol, tetraethylene glycol or mixtures of two or more thereof, with diaryl carbonates, an example being diphenyl carbonate or phosgene.

Likewise suitable as base polymers or as a polyol component for preparing the base polymers are polyacrylates which carry OH groups. Such polyacrylates are obtainable, for example, by polymerizing ethylenically unsaturated monomers which carry OH groups. Monomers of this kind are obtainable, for example, by esterifying ethylenically unsaturated carboxylic acids and difunctional alcohols, the alcohol generally being present only in a slight excess. Examples of ethylenically unsaturated carboxylic acids suitable for this purpose are acrylic acid, methacrylic acid, crotonic acid or maleic acid. Appropriate esters which carry OH groups are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate or mixtures of two or more thereof.

It may be the case that the molecular weight of the base polymer is too low for use as component A. An increase in the molecular weight can be accomplished, for example, by chain extension. Advantageously, for this purpose, the base polymer which carries terminal OH groups is first reacted with a compound which is polyfunctional, preferably difunctional, in respect of the terminal OH groups.

Suitable polyfunctional compounds in the sense of the invention are therefore, in particular, polyepoxides, especially diepoxides, or, preferably, polyisocyanates, especially diisocyanates. Particular preference is given in the context of the present invention to the diisocyanates. The stoichiometric proportions between base polymer and polyfunctional compound that are required in order to achieve a defined increase in molecular weight are known to the skilled worker. In general, however, it will be the case that in order to achieve a chain extension an excess of base polymer is present in the chain extension reaction, with the resultant, chain-extended base polymers again having terminal OH groups.

In order to be suitable for use as component A the abovementioned base polymers which have terminal OH groups and may have been chain extended must be provided with at least one functional group polymerizable by irradiation with UV light or with electron beams and at least one functional group polymerizable by reaction with a compound having at least one acidic hydrogen atom.

For this purpose, the base polymers are judiciously reacted with a compound which is polyfunctional, preferably difunctional, in respect of the terminal OH groups. Suitable polyfunctional compounds in the sense of the invention are the polyfunctional compounds which may already have been used for chain extension, especially polyepoxides, in particular diepoxides, but preferably polyisocyanates, especially diisocyanates. Particular preference is given in the context of the present invention to the diisocyanates.

Suitable polyfunctional polyisocyanates for reaction with the base polymers contain on average from two to not more than about four isocyanate groups. Examples of suitable isocyanates are 1,5-naphthalene diisocyanate, 4,4'-diphenylmethane diisocyanate (MDI), hydrogenated MDI (dicyclohexylmethane diisocyanate, $H_{12}$-MDI), xylylene diisocyanate (XDI), tetramethyl-xylylene diisocyanate (TMXDI), 4,4'-diphenyldimethylmethane diisocyanate, and also di- and tetraalkyldiphenylmethane diisocyanate, 4,4'-bibenzyl diisocyanate, 1,3-phenylene diisocyanate, 1,4-phenylene diisocyanate, 2,4- and 2,6-tolylene diisocyanate (TDI) and mixtures thereof, especially a mixture containing about 20% 2,4- and 80% by weight 2,6-tolylene diisocyanate, 1-methyl-2,4-diisocyanatocyclohexane, 1,6-diisocyanato-2,2,4-trimethylhexane, 1,6-di-isocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), cyclohexane 1,4-diisocyanate, ethylene diisocyanate, bisisocyanatoethyl phthalate; polyisocyanates containing reactive halogen atoms, such as 1-chloromethylphenyl2,4-diisocyanate, 1-bromoethylphenyl2,6-diisocyanate, and 3,3-bischloromethyl ether 4,4'-diphenyldiisocyanate. It is also possible to use sulfur-containing polyisocyanates, as obtainable, for example, by reacting 2 mol of hexamethylene diisocyanate with 1 mol of thiodiglycol or dihydroxydihexyl sulfide. Other diisocyanates are trimethylhexamethylene diisocyanates, 1,4-diisocyanatobutane, 1,2-diisocyanatododecane, and dimeric fatty acid diisocyanates. Triisocyanato isocyanurates can be obtained by trimerizing diisocyanates at elevated temperatures, for example, at about 200° and/or in the presence of a catalyst, for example, an amine, and may likewise be used in the context of the present invention. In the context of the present invention said polyisocyanates may be used individually or as a mixture of two or more of said polyisocyanates. Preferably, an individual polyisocyanate or a mixture of two or three polyisocyanates is used in the context of the present invention. Preferred polyisocyanates for use individually or in a mixture are HDI, MDI or TDI; for example, a mixture of MDI and TDI.

The base polymer is reacted with the polyfunctional compound, preferably with the diisocyanate, preferably in a ratio of 1:>2, the excess of polyfunctional compound being chosen, for example, to be just sufficient that chain extension of the base polymer is avoided but only small amounts of unreacted polyfunctional compound are present in component A. A procedure of this kind may be advantageous especially when using a diisocyanate as polyfunctional compound. In this way a polymer is obtained which carries, terminally, two functional groups polymerizable by reaction with a compound having at least one acidic hydrogen atom.

From a polymer of this kind, in order to obtain a polymer suitable for use as component A, the polymer is reacted judiciously with a compound having both a functional group polymerizable by irradiation with UV light or with electron beams and a functional group suitable for reaction with the terminal functional group on the polymer. Particularly suitable for this purpose are the hydroxyalkyl acrylates or methacrylates, i.e., reaction products of acrylic acid or methacrylic acid with difunctional alcohols. Particularly suitable in the context of the present invention are, for example, 2-hydroxyethyl acrylate, 2-hydroxyethyl methacrylate, 2-hydroxypropyl acrylate, 2-hydroxypropyl methacrylate, 3-hydroxypropyl acrylate or 3-hydroxypropyl methacrylate, or mixtures of two or more thereof.

The molar ratios between base polymer and the compound having both a functional group polymerizable by irradiation with UV light or with electron beams and a functional group capable of reacting with the terminal functional group on the polymer may vary within wide limits in the reaction. In general it is the case that a higher proportion of functional groups polymerizable by irradiation with UV light or with electron beams in component A results in an increased strength of an adhesive bond, whereas a higher proportion of functional groups reactive with a compound having at least one acidic hydrogen atom leads to a higher ultimate strength.

If, for example, the base polymer is reacted in a molar ratio of approximately 1:1 with the compound which has both a functional group polymerizable by irradiation with UV light or with electron beams and a functional group capable of reacting with the terminal functional group on the polymer, then each polymer molecule in the polymer mixture obtainable therefrom carries on average both one functional group polymerizable by irradiation with UV light or with electron beams and one functional group reactive with a compound having at least one acidic hydrogen atom. Accordingly, the proportions of the two types of functional groups in the polymer mixture obtainable by a reaction of this kind may be varied in each case between greater than 0 and less than 100% (based on functional groups in the sense of the present invention). Good results can be obtained, for example, if from about 1 to about 50% of the functional groups present as terminal groups in the polymer are functional groups polymerizable by irradiation with UV light or with electron beams, preferably from about 5 to about 30%, and with particular preference from about 8 to about 15%.

Polymers suitable for use in component A may, for example, also be obtained in a plurality of steps such that in a first step the base polymer which carries terminal OH groups is reacted with a compound which has both a functional group polymerizable by irradiation with UV light or with electron beams and a functional group capable of reacting with the terminal OH group on the base polymer. An example of such a compound is styrene isocyanate. Further such compounds may be obtained, for example, by reacting an approximately equimolar amount of a hydroxyalkyl acrylate or methacrylate with a diisocyanate. Following reaction of an approximately equimolar amount of the base polymer (which may have been adapted by chain extension to the molecular weight required for use in component A) with such a compound a polymer is formed in a second step, which, terminally, has both an OH group and a functional group polymerizable by irradiation with UV light or with electron beams. If this polymer is reacted, for example, with a diisocyanate, the result is a polymer suitable for use in component A.

It is likewise possible to combine the two abovementioned steps by reacting in an appropriate molar ratio a base polymer, a diisocyanate (or, if desired, another polyfunctional compound in the abovementioned sense) and a compound having both a functional group polymerizable by irradiation with UV light or with electron beams and a functional group capable of reacting with the terminal OH group on the base polymer with one another so that the proportions of the two types of functional groups in the polymer mixture obtainable by such a reaction vary in each case between greater than 0% and less than 100% (based on functional groups). Good results can be obtained, for example, if from about 1 to about 50% of the functional groups present as terminal groups in the polymer are functional groups polymerizable by irradiation with UV light or with electron beams, preferably from about 5 to about 30%, and with particular preference from about 8 to about 15%.

At processing temperatures suitable for typical applications, typical polymers suitable for use in component A have a viscosity of from about 1000 mPas to about 10,000 mPas, in particular from about 3000 mPas to about 7000 mPas (Brookfield CAP 2000, 25–150° C., cone 6, 50 rpm, measurement time 25 s). Typical processing temperatures are, for example, from about 25 to about 70° C. for the production of flexible packaging films, from about 70 to about 80° C. for the lamination of high-gloss films, and from about 80 to about 150° C. for applications in the textile sector.

Typical NCO values for polymers suitable for use in component A are from about 2.5% by weight to about 7% by weight, in particular from about 3.5% by weight to about 5% by weight.

The component A used in the context of the present invention may consist only of one of the polymers described; however, it may advantageously constitute a mixture of two or more of said polymers. Thus it is advantageous, for example, if the base polymer used comprises a mixture of one or more polyester polyols and one or more polyether polyols. The different base polymers in this case may differ, for example, in the molecular weight ($M_n$) or in the chemical structure, or in both respects.

In one preferred embodiment of the invention the base polymers used to prepare component A comprise from about 20 to about 40% by weight of polyester polyols and from about 20 to about 60% by weight of polyether polyols, based on the total component A. In another preferred embodiment at least two different polyether polyols are used as base polymers in addition to a polyester polyol; in particular, a mixture of one polyether polyol having a molecular weight of from about 800 to about 1500 and one polyether polyol having a molecular weight of from about 300 to about 700.

To prepare component A it is possible, as described above, for the individual base polymers to be equipped with functional groups and, if desired, chain extended so that they are suitable directly for use as component A. In one preferred embodiment of the invention, however, a mixture of OH-carrying base polymers is reacted first with an appropriate amount of polyisocyanates and subsequently, in an appropriate molar ratio, with compounds having both a functional group polymerizable by irradiation with UV light or with electron beams and a functional group capable of reacting with the terminal OH group on the base polymer.

As component B, the adhesives of the invention comprise at least one compound having a molecular weight of from about 100 to about 8000 which has at least two functional groups polymerizable by irradiation with UV light or with electron beams. Particularly suitable components B are difunctional or higher polyfunctional acrylate or methacrylate esters. Such acrylate or methacrylate esters include, for example, esters of acrylic acid or methacrylic acid with aromatic, aliphatic or cycloaliphatic polyols or acrylate esters of polyether alcohols.

Polyols which can be used to prepare an acrylate or methacrylate ester which can be used as component B may be a large number of polyols. Examples are aliphatic polyols having 2–4 OH groups per molecule and 2 to about 40 carbon atoms. The OH groups may be in either primary or secondary attachment. Suitable aliphatic polyols include for example ethylene glycol, 1,2-propanediol, 1,3-propanediol, 1,4-butanediol, 1,3-butanediol, 2,3-butanediol, 1,4-butenediol, 1,4-butynediol, 1,5-peritanediol, and the isomeric pentanediols, pentenediols or pentynediols or mixtures of two or more thereof, 1,6-hexanediol, and the isomeric hexanediols, hexenediols or hexynediols or mixtures of two or more thereof, 1,7-heptanediol and the isomeric heptane-, heptene- or heptynediols, 1,8-octanediol and the isomeric octane-, octene- or octynediols, and the higher homologs or isomers of said compounds, as they result for the skilled worker from a stepwise extension of the carbon chain by one $CH_2$ group in each case or with introduction of branching into the carbon chain, or mixtures of two or more thereof.

Likewise suitable are alcohols of higher functionality, such as glycerol, trimethylolpropane, pentaerythritol or sugar alcohols such as sorbitol or glucose, for example, and also oligomeric ethers of said substances with themselves or in a mixture of two or more of said compounds with one another, an example being polyglycerol having a degree of polymerization of from about 2 to about 4. With the higher-functional alcohols it is possible for one or more OH groups to be esterified with monofunctional carboxylic acids having 1 to about 20 carbon atoms, with the proviso that on average at least two OH groups are retained. Said higher-functional alcohols may be used in pure form or, where possible, as technical-grade mixtures obtainable in the synthesis of said alcohols.

As the polyol component for preparing the acrylate or methacrylate esters a further possibility is to use the reaction products of low molecular mass polyfunctional alcohols with alkylene oxides, which are known as polyether polyols. Polyether polyols intended for use to prepare polyesters suitable as base polymers are preferably obtained by reacting polyols with alkylene oxides. The alkylene oxides have preferably two to about four carbon atoms. Suitable examples are the reaction products of ethylene glycol, propylene glycol, the isomeric butanediols or hexanediols, as mentioned above, or mixtures of two or more thereof, with ethylene oxide, propylene oxide or butylene oxide or mixtures of two or more thereof. Also suitable, furthermore, are the reaction products of poly-functional alcohols such as glycerol, trimethylolethane or trimethylolpropane, pentaerythritol or sugar alcohols or mixtures of two or more thereof with said alkylene oxides to give polyether polyols. Particularly suitable polyether polyols are those obtainable from said reactions and having a molecular weight ($M_n$) of from about 100 to about 2000, preferably from about 150 to about 1500, in particular from about 150 to about 800.

Acrylate esters of aliphatic diols having 2 to about 40 carbon atoms include, for example, neopentyl glycol di(meth)acrylate, 1,6-hexanediol di(meth)-acrylate, trimethylolpropane tri(meth)acrylate, pentaerythritol tetra(meth)acrylate, and (meth)acrylate esters of sorbitol and of other sugar alcohols. These (meth)acrylate esters of aliphatic or cycloaliphatic diols may be modified with an aliphatic ester or with an alkylene oxide. The acrylates modified by an aliphatic ester include, for example, neopentyl glycol hydroxypivalate di(meth)acrylate, caprolactone-modified neopentyl glycol hydroxypivalate di(meth)acrylates and the like. The alkylene oxide-modified acrylate compounds include, for example, ethylene oxide-modified neopentyl glycol di(meth)acrylates, propylene oxide-modified neopentyl glycol di(meth)acrylates, ethylene oxide-modified 1,6- hexanediol di(meth)acrylates or propylene oxide-modified 1,6-hexanediol di(meth)acrylates, or mixtures of two or more thereof.

Acrylate monomers constructed on the basis of polyether polyols include, for example, neopentyl glycol-modified trimethylolpropane di(meth)acrylates, polyethylene glycol di(meth)acrylates, polypropylene glycol di(meth)acrylates and the like. Trifunctional and higher polyfunctional acrylate monomers include, for example, trimethylolpropane tri(meth)acrylate, pentaerythritol tri(meth)acrylate, dipentaerythritol tetra(meth)acrylate, dipentaerythritol penta (meth)acrylate, dipentaerythritol hexa(meth)acrylate, caprolactone-modified dipentaerythritol hexa(meth) acrylate, pentaerythritol tetra(meth)acrylate, tris[(meth) acryloxyethyl] isocyanurate, caprolactone-modified tris [(meth)acryloxyethyl] isocyanurates or trimethylolpropane tetra(meth)acrylate, or mixtures of two or more thereof.

Among the abovementioned difunctional, trifunctional or higher polyfunctional acrylate monomers which can be used in accordance with the invention as component B, preference is given to tripropylene glycol diacrylate, neopentyl glycol propoxylate di(meth)acrylate, trimethylolpropane tri (meth)acrylate, and pentaerythritol triacrylate.

The adhesives of the invention comprise component A in an amount of from about 10 to about 99.9% by weight, preferably from about 15 to about 99% by weight, and component B in an amount of from about 90 to about 0.1% by weight, preferably from about 85 to about 1% by weight, based on the sum of the components A and B.

In addition to component A and component B the adhesive may comprise as component C at least one photoinitiator which under UV irradiation initiates the polymerization of olefinically unsaturated double bonds.

As component C a photoinitiator is generally used, therefore, which on irradiation with light having a wavelength of from about 260 to about 480 nm is able to initiate a free-radical polymerization of olefinically unsaturated double bonds. Suitable for use as component C in the context of the present invention are, in principle, all customary photoinitiators that are compatible with the adhesive of the invention, i.e., which result in at least substantially homogeneous mixtures.

Examples of these are all Norrish type I fragmenting substances. Examples of such substances are benzophenone, camphorquinone, Quantacure (manufacturer: International Bio-Synthetics), Kayacure MBP (manufacturer: Nippon Kayaku), Esacure BO (manufacturer: Fratelli Lamberti), Trigonal 14 (manufacturer: Akzo), photoinitiators of the Igacure®, Darocure® or Speedcure® series (manufacturer: Ciba-Geigy), Darocure® 1173 and/or Fi-4 (manufacturer: Eastman). Of these, particular suitability is possessed by Irgacure® 651, Irgacure® 369, Irgacure® 184, Irgacure® 907, Irgacure® 1850, Irgacure® 1173 (Darocure® 1173), Irgacure® 1116, Speedcure® EDB, Speedcure® ITX, Irgacure® 784 or Irgacure® 2959, or mixtures of two or more thereof. Also suitable is 2,4,6-trimethylbenzenediphenylphosphine oxide (Lucirin TPO, manufacturer: BASF AG), which may also be used in a mixture of one or more of the abovementioned photoinitiators.

Conventional photoinitiators of low molecular mass may contribute to the formation of migrants in composite materials. The migrants in question are the photoinitiators themselves that are present in the adhesive; a further source of migrants is constituted, however, by fragments of the photoinitiators, as may be produced on irradiation of the adhesive with UV rays. Under certain circumstances—for example, when producing composite materials intended for use as food packaging—the presence of migratable compounds in the adhesive is avoided as far as possible. The migrateable compounds content of the adhesive of the invention can generally be reduced still further if the photoinitiator has a molecular weight which substantially hinders, or even prevents, migration.

In the context of a preferred embodiment, component C therefore comprises, at least proportionally, a photoinitiator having a molecular weight of more than about 200. Commercially available photoinitiators which meet this condition are, for example, Irgacure® 651, Irgacure® 369, Irgacure® 907, Irgacure® 784, Speedcure® EDB, or Speedcure® ITX.

Photoinitiators which in terms of their molecular weight meet the abovementioned condition are also obtainable, however, by reacting a low molecular mass photoinitiator which has an isocyanate-reactive functional group—for example, an amino group or an OH group—with a high molecular mass compound having at least one isocyanate group (polymer-bonded photoinitiators). As the component it is preferred to use compounds which carry more than one photoinitiator molecule—for example, two, three or more photoinitiator molecules. Such compounds may be obtained, for example, by reacting a polyfunctional alcohol having two or more OH groups with suitable di- or triisocyanates and photoinitiators having a suitable, isocyanate-reactive functional group.

Polyfunctional alcohols which can be used are all of the abovementioned polyfunctional alcohols, but especially neopentyl glycol, glycerol, trimethylolpropane, pentaerythritol and alkoxylation products thereof with $C_{2-4}$ alkylene oxides. Likewise suitable as polyfunctional alcohols, and particularly preferred in the context of the present invention, are the reaction products of trihydric alcohols with caprolactone; for example, the reaction product of trimethylolpropane with caprolactone (Capa® 305, from Interox, Cheshire, UK, molecular weight $(M_n)$=540).

In one preferred embodiment of the invention, component C comprises a photoinitiator obtainable by reacting an at least trihydric alcohol with caprolactone to give a polycaprolactone which carries at least three OH groups and has a molecular weight of from about 300 to about 900, and subsequently linking the polycaprolactone with 1-[4-(2-hydroxyethoxy) phenyl]-2-hydroxy-2-methylpropan-1-one by means of a compound which carries at least two isocyanate groups.

As compounds which carry at least two isocyanate groups, especially as diisocyanates for reaction with said polyols, suitable compounds include, for example, all those diisocyanates specified within this text. Particular preference is given, however, to the 2,4 and the 2,6 isomer of tolylene diisocyanate (TDI), it being possible to use the isomers in their pure form or as a mixture.

Suitable photoinitiators for preparing the polymer-bonded photoinitiators are all photoinitiators which have a functional group which is reactive toward isocyanate groups. Particular preference is given in the context of the present invention to 1-[4-(2-hydroxyethoxy)phenyl]-2-hydroxy-2-methylpropan-1-one (Irgacure® 2959), which has an OH group in primary attachment.

If desired, the photoinitiators which can be used in component C may also be prepared by using a minor amount of photoinitiator molecules which are reactive toward isocyanate groups when preparing component A or component B or in both preparation processes. This leads to the attachment of the photoinitiator to a molecule of component A or of component B.

A further possibility is to effect the attachment of the photoinitiator to a polymer chain, for example, to component A, by adding the photoinitiator which has an appropriate functional group in monomeric form to the adhesive and then, during a storage period of the adhesive, for instance, reacting it with a corresponding polymeric component, for example, component A.

A further possibility is to provide the photoinitiator with a functional group polymerizable by irradiation with UV light or with electron beams, the functional group polymerizable with UV light or with electron beams being attachable to the photoinitiator by way, for example, of a reaction of the photoinitiator with an unsaturated carboxylic acid. An example of an unsaturated carboxylic acid is acrylic acid or methacrylic acid. Particularly suitable in the context of the present invention are the reaction products of Irgacure® 2959 with acrylic acid or methacrylic acid.

It is possible, accordingly, to use as component C a compound which has both a photoinitiator and a functional group polymerizable by irradiation with UV light or with electron beams or a functional group capable of reacting with at least one compound having an acidic hydrogen atom, or both.

The adhesive of the invention comprises component C in an amount of up to about 25% by weight, based on the total adhesive; the lower limit should be situated at approximately 0.01% by weight. Based on the individual photoinitiator molecule itself, irrespective of whether it is covalently bonded to another compound, the portion in the adhesive should be situated at at least about 0.01% by weight up to about 10% by weight, preference being given to a proportion of from about 0.5 to about 5% by weight, and with particular preference from about 1 to about 3% by weight, based on the total adhesive.

In one preferred embodiment the adhesive of the invention may further comprise, as monofunctional reactive diluent, at least one compound which possesses only one functional group polymerizable by irradiation with UV light or with electron beams and which otherwise has no other groups which are reactive in the sense of components A, B or C. Particularly suitable for this purpose are those compounds which are flowable at room temperature, especially corresponding esters of acrylic acid or methacrylic acid. Particularly suitable compounds are, for example, the acrylic or methacrylic esters of aromatic or aliphatic, linear or branched $C_{4-20}$ monoalcohols or of corresponding ether alcohols, examples being n-butyl acrylate, 2-ethylhexyl acrylate, 3-methoxybutyl acrylate, 2-phenoxyethyl acrylate, benzyl acrylate or 2-methoxypropyl acrylate.

The monofunctional reactive diluents in the adhesive constitute a fraction of up to about 50% by weight, but preferably below that level; for example, about 40% by weight, 30% by weight or about 20% by weight. The use of smaller amounts is likewise possible; thus the adhesive of the invention may also contain only 10% by weight, or an amount of from about 0.5 to about 8% by weight, of monofunctional reactive diluent.

Following the conclusion of a first curing stage by irradiation with, for example, electron beams or UV rays (in conjunction with a corresponding photoinitiator as component C), the adhesive of the invention may cure by the influence of atmospheric moisture until the required ultimate strength is attained. If, however, rapid attainment of a certain ultimate strength is required, i.e., a high curing rate, in order for example to enable the bonded materials to be processed further as rapidly as possible, the curing rate based on curing by atmospheric moisture may be too low. In such cases, a curing agent may be added as component D to the adhesive prior to processing.

The invention therefore additionally provides an adhesive which comprises (d) as component D a compound having at least two acidic hydrogen atoms.

As component D it is preferred to use a compound having at least two functional groups having in each case at least one acidic hydrogen atom, or a mixture of two or more such compounds, which are able to react with the corresponding functional group of component A. The corresponding functional groups of component A in the context of the present text are all functional groups present in component A which are not polymerizable by irradiation under the conditions of the invention, especially isocyanate groups.

The compounds which can be used as component D preferably have a molecular weight of up to 2500. Functional groups having at least one acidic hydrogen atom which are reactive with the corresponding functional groups of component A are suitably, in particular, primary or secondary amino groups, mercapto groups or OH groups. The compounds which can be used as component D may have amino groups, mercapto groups or OH groups in each case exclusively or in a mixture.

The functionality of the compounds which can be used in component D is generally at least about two. Preferably component D includes a fraction of compounds of higher functionality, having for example a functionality of three, four or more. The total (average) functionality of the component D is, for example, approximately two (for example, if only difunctional compounds are used as component D), or more—for example, about 2.1, 2.2, 2.5, 2.7 or 3. If desired, component D may have an even higher functionality—for example, about four or more.

Component D preferably comprises a polyol which carries at least two OH groups. Polyols suitable for use in component D are all those polyols mentioned in the course of the present text, provided they comply with the restricting criterion of the upper limit on the molecular weight.

Component D is generally used in an amount such that the ratio of groups of component A which are reactive with component D to groups of component D that are reactive with corresponding functional groups of component A is from about 5:1 to about 1:1, in particular from about 2:1 to about 1:1.

The adhesive of the invention preferably comprises as component D a compound having at least two OH groups.

The adhesive of the invention generally has a viscosity at 50° C. of from about 1000 mPas to about 30,000 mPas (Brookfield CAP 200, 50° C., cone 6, 50 rpm, measurement time 25 s). In preferred embodiments of the invention the viscosity of the adhesive is chosen so that at typical processing temperatures it has a viscosity of from about 1000 mPas to about 4000 mPas (Brookfield CAP 200, 25–150 C., cone 6, 50 rpm, measurement time 25 s). Typical processing temperatures are, for example, from about 25 to about 70° C. in the case of the production of flexible packaging films, from about 70 to about 80° C. in the case of the lamination of high-gloss films, and from about 80 to about 150° C. in the case of applications in the textile sector.

If desired, the adhesive of the invention may further comprise additives, which may account for a fraction of up to about 49% by weight of the overall adhesive.

Additives which may be used in the context of the present invention include, for example, plasticizers, stabilizers, antioxidants, colorants or fillers.

Plasticizers used are, for example, plasticizers based on phthalic acid, especially dialkyl phthalates, preference as plasticizers being given to phthalic esters which have been esterified with a linear alcohol containing about 6 to about 12 carbon atoms. Particularly preferred in this context is dioctyl phthalate.

Likewise suitable as plasticizers are benzoate plasticizers, examples being sucrose benzoate, diethylene glycol dibenzoate and/or diethylene glycol benzoate in which from about 50 to about 95% of all hydroxyl groups have been esterified, phosphate plasticizers, an example being t-butylphenyl diphenyl phosphate, polyethylene glycols and their derivatives, examples being diphenyl ethers of poly (ethylene glycol), liquid resin derivatives, an example being the methyl ester of hydrogenated resin, animal and vegetable oils, examples being glycerol esters of fatty acids, and polymerization products thereof.

Stabilizers or antioxidants which can be used as additives in the context of the invention include phenols, high molecular weight ($M_n$) sterically hindered phenols, polyfunctional phenols, sulfur-containing and phosphorus-containing phenols or amines. Examples of phenols which can be used as additives in the context of the invention are hydroquinone, hydroquinone monomethyl ether, 2,3-di-tert-butylhydroquinone, 1,3,5-trimethyl-2,4,6-tris(3,5-di-tert-butyl-4-hydroxybenzyl)benzene; butylated hydroxytoluene (BHT), pentaerythritol tetrakis-3-(3,5-di-tert-butyl-4-hydroxyphenyl)propionate; n-octadecyl 3,5-di-tert--butyl-4-hydroxyphenylpropionate; 4,4-methylenebis(2,6-di-tert-butylphenol); 4,4-thiobis (6-tert-butyl-o-cresol); 2,6-di-tert-butylphenol; 6-(4-hydroxyphenoxy) -2,4-bis (n-octylthio)-1,3,5-triazine; di-n-octadecyl 3,5-di-tert-butyl-4-hydroxybenzylphosphonates; 2-(n-octylthio)ethyl 3,5-di-tert-butyl-4-hydroxybenzoate; and sorbitol hexa[3-(3,5-di-tert-butyl-4-hydroxyphenyl) propionate]; and also p-hydroxydiphenylamine or N,N'-diphenylenediamine or phenothiazine.

Further additives may be included in the adhesives of the invention in order to vary certain properties. Such additives may, for example, be colorants such as titanium dioxide, fillers such as talc, clay and the like. If appropriate, small amounts of thermoplastic polymers may be present in the adhesives of the invention, examples being ethylenevinyl acetate (EVA), ethylene-acrylic acid, ethylenemethacrylate and ethylene-n-butyl acrylate copolymers, which may impart additional flexibility, toughness and strength to the adhesive. It is likewise possible to add certain hydrophilic polymers, examples being polyvinyl alcohol, hydroxyethylcellulose, hydroxypropylcellulose, polyvinyl methyl ether, polyethylene oxide, polyvinylpyrrolidone, polyethyloxazolines or starch or cellulose esters, especially the acetates with a degree of substitution of less than 2.5, which increase, for example, the wettability of the adhesives.

The adhesive of the invention preferably comprises from about 10% by weight to about 99.9% by weight of component A, from about 0.1% by weight to about 90% by weight of component B, from about 0% by weight to about 10% by weight of component C, from about 0% by weight to about 49% by weight of component D, and from about 0% by weight to about 49% by weight of additives, the sum of said constituents being 100% by weight.

In a particularly preferred embodiment the adhesive of the invention preferably comprises, approximately, from about 15% by weight to about 99% by weight of component A, from about 1% by weight to about 85% by weight of component B, from about 0% by weight to about 10% by weight of component C, from about 0% by weight to about 49% by weight of component D, and from about 0% by weight to about 49% by weight of additives, the sum of said constituents being 100% by weight.

The adhesives of the invention can be prepared by customary techniques which are known to the worker skilled in the art of preparing polymeric mixtures.

In the context of the present invention, the adhesive of the invention is customarily prepared by mixing the components stated in each case.

In principle, the adhesive of the invention can be used in the adhesive bonding of a very wide variety of materials. The materials which may be bonded include, for example, wood, metal, glass, vegetable fibers, stone, paper, cellulose hydrate, plastics such as polystyrene, polyethylene, polypropylene, polyethylene terephthalate, polyvinyl chloride, copolymers of vinyl chloride and vinylidene chloride, copolymers of vinyl acetate-olefins, polyamides, or metal foils, of aluminum, lead or copper, for example.

In one preferred embodiment the adhesive of the invention is used in the production of composite materials.

The present invention therefore further provides a process for producing composite materials which comprises using an adhesive of the invention. In another preferred embodiment, the composite materials which can be produced with the aid of the adhesive of the invention are film composites obtainable by the part-area or full-area adhesive bonding of films.

The application of the adhesive of the invention to the materials to be bonded, especially the films, can be carried out using machinery commonly used for such purposes, such as conventional laminating machines. A particularly appropriate procedure is the application of the adhesive in the liquid state to a film which is to be bonded to form a laminate. Subsequently, the film thus coated with the adhesive is transferred into an irradiation zone in which the polymerization reaction, i.e., the crosslinking of the individual components, is initiated by exposure to ultraviolet radiation. The adhesive of the invention develops adhesion—for example, contact adhesion, but preferably pressure-sensitive adhesion—by virtue of the irradiation and the associated crosslinking reaction of the individual components present in the adhesive. Following the irradiation procedure, the first film coated with the irradiated adhesive is laminated with at least one second film, with or without the application of pressure.

This procedure is particularly advantageous for the mutual adhesive bonding of two films which are impervious to a radiation which is required for initiation of polymerization.

The bonding and laminating procedure described may be repeated a number of times, so that it is possible to produce laminates which consist of more than two bonded layers.

The invention therefore further provides a composite material produced by a process of the invention using an adhesive of the invention.

The adhesive of the invention can be applied by all suitable methods to the surfaces that are to be bonded; for example, by spraying or knife coating.

The invention is illustrated below by means of examples.

EXAMPLES

Implementation of the Measurements

Polyester films (polyethylene terephthalate (PET), thickness 50 μm) were cut to a size of about 15×19 cm and the surface was subsequently cleaned with methanol. The test adhesive was knife coated onto half of the film, on a coherent region. Subsequently, the adhesive was exposed using a UV lamp (Ultra Jet 100 from Köhler); the exposure time was one second. Directly following exposure, a second film was applied congruently and pressed on with a manual roller. The film composite obtained in this way was cut into strips 3 cm in width, and the thickness of the composite was measured. The film thickness of the adhesive was in all cases from about 30 to 100 μm. Following the storage times indicated below, the peel values were then determined for the purpose of testing strength. The peel values were measured in accordance with DIN 53539 using a Zwick model 144501/00 testing machine. Measurement was carried out with a 10 kN force transducer and with a 0.1 kN force transducer. The test speed was 100 mm/min. The strengths determined in this way are reported in the individual examples, in N/15 mm.

Example 1 (Comparative Example)

A polymer having an NCO number of 4.4% by weight (molecular weight ($M_n$) about 2000) was prepared from 32% by weight of a polyester having a molecular weight of about 800, 33% by weight of a polypropylene glycol having a molecular weight of about 1000, 9% by weight of a polypropylene glycol having a molecular weight of about 400, 24% by weight of TDI and about 5% by weight of MDI. The viscosity was about 5200 mPas (Brookfield CAP 200, 70° C., cone 6, 50 rpm, measurement time 25 s). 10% of the NCO groups were reacted with hydroxyethyl acrylate. The product obtainable in this way (component A) had an NCO number of about 4.0 and a viscosity of about 5700 mpas.

One part of the photoinitiator Irgacure® 651 was added to 100 parts of component A. This mixture was subsequently tested for adhesion.

The values measured were as follows:

| after 30 min | 0.03 N/15 mm |
|---|---|
| after 7 days | 9 N/15 mm |
| after 14 days | 10 N/15 mm |

Example 2
(In Accordance with the Invention)
Component A

A polymer having an NCO number of 4.4% by weight (molecular weight ($M_n$) about 2000) was prepared from 32% by weight of a polyester having a molecular weight of about 800, 33% by weight of a polypropylene glycol having a molecular weight of about 1000, 9% by weight of a polypropylene glycol having a molecular weight of about 400, 24% by weight of TDI and about 5% by weight of MDI. The viscosity was about 5200 mpas (Brookfield CAP 200, 70° C., cone 6, 50 rpm, measurement time 25 s). 10% of the NCO groups were reacted with hydroxyethyl acrylate. The product obtainable in this way (component A) had an NCO number of about 4.0 and a viscosity of about 5700 mPas.

Component B: Polyethylene glycol-200 diacrylate Photoinitiator: Irgacure® 369

5 parts of component B and 1 part of photoinitiator were mixed with 100 parts of component A. This mixture was subsequently tested for adhesion.

The values measured were as follows:

| after 30 min | 0.3 N/15 mm |
|---|---|
| after 7 days | 7 N/15 mm |
| after 14 days | 8 N/15 mm |

Example 3
(In Accordance with the Invention)
Component A

To prepare the component A, a commercially available, moisture-curing, NCO-containing laminating adhesive (LIOFOL UR 7746, from Henkel, Düsseldorf (DE)) was reacted with hydroxyethyl acrylate such that 10% of the NCO groups reacted to give the corresponding urethane.

Component B: Polyethylene glycol-200 diacrylate

Photoinitiator: 423.74 g of Capa 305 (trifunctional polycaprolactone, OH number=188.3) were reacted with 391.5 g of 2,4-TDI (NCO number=12.3%). 107.7 g (0.1 mol) of this prepolymer were admixed with 219.6 g (1.0 mol) of Irgacure® 2959 and the mixture was reacted until the NCO number had fallen to 0%.

5 parts of component B and 5 parts of photoinitiator were mixed with 100 parts of component A. The mixture was subsequently tested for adhesion.

The values measured were as follows:

| after 30 min | 0.4 N/15 mm |
|---|---|
| after 7 days | 5 N/15 mm |
| after 14 days | 7 N/15 mm |

Example 4
(In Accordance with the Invention)
Component A

To prepare the component A, a polymer having acrylate groups and terminal NCO groups was prepared first of all. For this purpose, 102 g of a polyester (OH number 134) prepared from adipic acid, isophthalic acid, 1,2-propylene glycol and diethylene glycol, 74.52 g of a polyester (OH number 9, acid number 6) prepared from adipic acid, isophthalic acid, ethylene glycol and diethylene glycol, 22.63 g of propylene glycol (OH number 105), 53.7 g of TDI, 18.59 g of MDI and 10.34 g of 2-hydroxyethyl acrylate were reacted with one another.

Component B: Trimethylolpropane triacrylate (TMPTA)

Photoinitiator: 15.27 g of Irgacure 907 and 6.11 g of Lucirin TPO

Component A was mixed with the stated amount of photoinitiator. Subsequently, 100 parts by weight of the resulting mixture were mixed with 5 parts by weight of component B. This mixture was subsequently tested for adhesion.

The values measured were as follows:

| after 60 min | 2.9 N/15 mm |
|---|---|
| after 7 days | 3.3 N/15 mm |

What is claimed is:

1. An adhesive composition comprising three components A, B and C:
   (a) component A being at least one polymer having a molecular weight ($M_n$) of at least 800 that has at least one functional group polymerizable by irradiation with ultraviolet (UV) light or with electron beams and has at least one functional group capable of reacting with a compound having at least one acidic hydrogen atom;
   (b) component B being at least one compound having a molecular weight ($M_n$) of from about 100 to about 8000 which has at least two functional groups polymerizable by irradiation with UV light or with electron beams; and
   (c) component C comprises at least one photoinitiator obtained by reacting a polyfunctional alcohol having two or more OH groups with a di- or triisocyanate and a photoinitiator having at least two isocyanate-reactive functional groups and which is capable of initiating the polymerization of olefinically unsaturated double bonds on exposure to UV radiation.

2. The adhesive composition of claim 1 wherein component C comprises a photoinitiator obtained by reacting an at least trihydric alcohol with caprolactone to give a polycaprolactone which carries at least three OH groups and has a molecular weight of from about 300 to about 900, and subsequently linking the polycaprolactone with 1-[4-(2-hydroxyethoxy)phenyl]-2-hydroxy-2-methylpropan-1-one by means of a compound which carries at least two isocyanate groups.

3. The adhesive composition of claim 2 further comprising as component D a compound having at least two acidic hydrogen atoms.

4. The adhesive composition of claim 1 further comprising a monofunctional reactive diluent.

5. The adhesive composition of claim 1 which further comprises,
   (d) as component D a compound having at least two acidic hydrogen atoms.

6. The adhesive composition of claim 5 wherein a compound having at least two OH groups is present as component D.

* * * * *